United States Patent [19]

Goode

[11] 4,227,232

[45] Oct. 7, 1980

[54] CLUTCH PROTECTION CIRCUIT

[75] Inventor: Jonathan M. Goode, Lexington, Mass.

[73] Assignee: The United States of America as represented by the Secretary of the Air Force, Washington, D.C.

[21] Appl. No.: 18,696

[22] Filed: Mar. 8, 1979

Related U.S. Application Data

[63] Continuation-in-part of Ser. No. 806,434, Jun. 14, 1977, abandoned.

[51] Int. Cl.³ .............................................. H02H 3/24
[52] U.S. Cl. ..................................... 361/191; 361/189
[58] Field of Search ............... 361/191, 192, 193, 194, 361/189, 166, 187, 92, 111, 110, 114; 307/113, 115, 130; 274/4 D, 11 D; 340/147 R, 147 LP

[56] References Cited

U.S. PATENT DOCUMENTS

| | | | |
|---|---|---|---|
| 1,481,377 | 1/1924 | Laude | 361/92 |
| 1,958,161 | 5/1934 | Crago et al. | 361/191 X |
| 2,556,220 | 6/1951 | Rosenberger | 361/191 X |
| 2,699,507 | 1/1955 | Schnarz | 361/191 X |
| 2,796,575 | 6/1957 | Arnot | 361/92 X |
| 2,814,732 | 11/1957 | McFarland | 361/191 X |
| 3,636,375 | 1/1972 | Armstrong | 361/191 X |
| 3,860,910 | 1/1975 | Hudson | 361/194 X |
| 3,962,611 | 6/1976 | Miller | 361/194 |

*Primary Examiner*—Patrick R. Salce
*Attorney, Agent, or Firm*—Joseph E. Rusz; Henry S. Miller

[57] ABSTRACT

A circuit for the protection of devices from power line transients and accidental shut-down requiring operator performance for restart including a push button switch for resetting holding relays to operate the apparatus.

6 Claims, 2 Drawing Figures

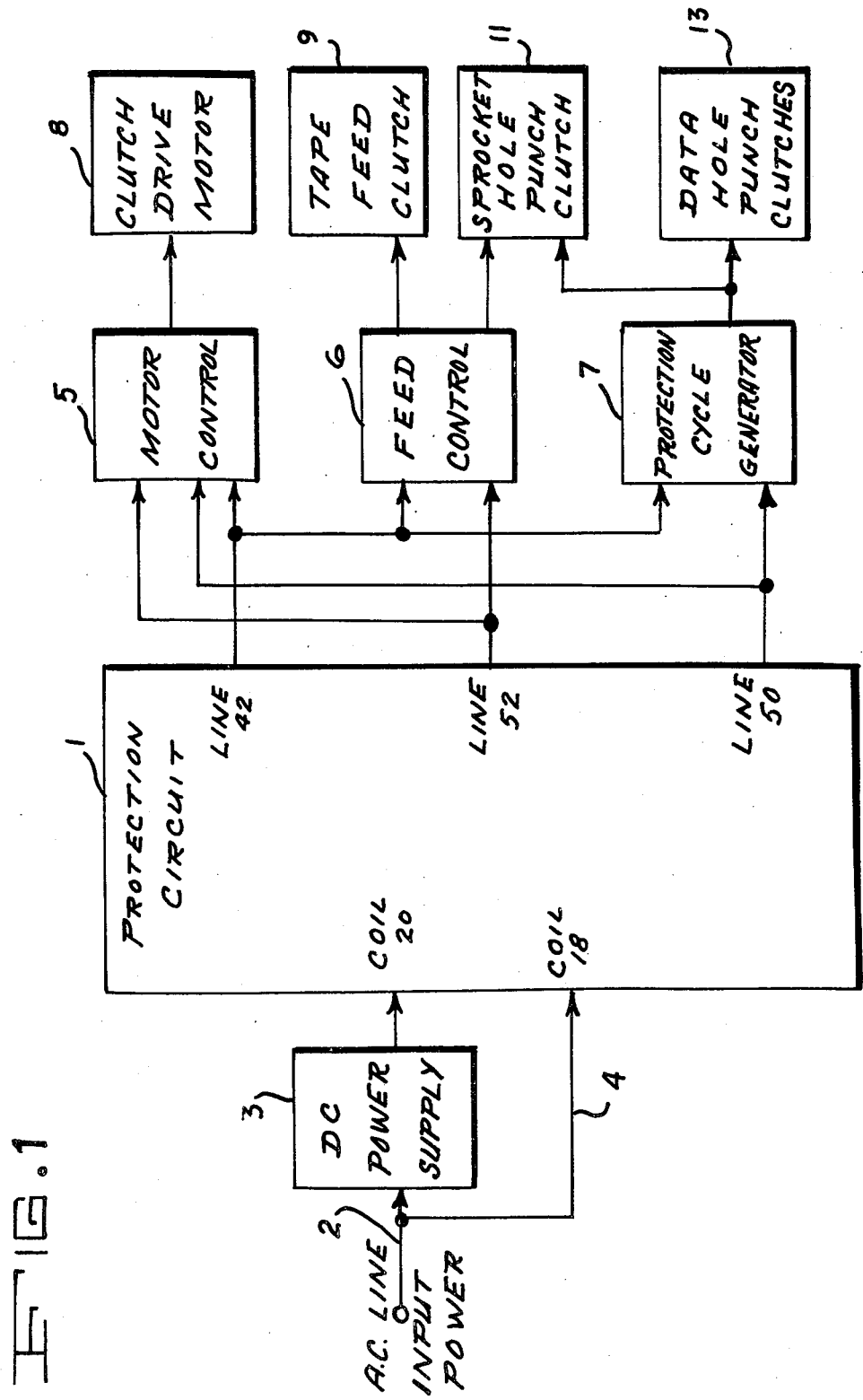

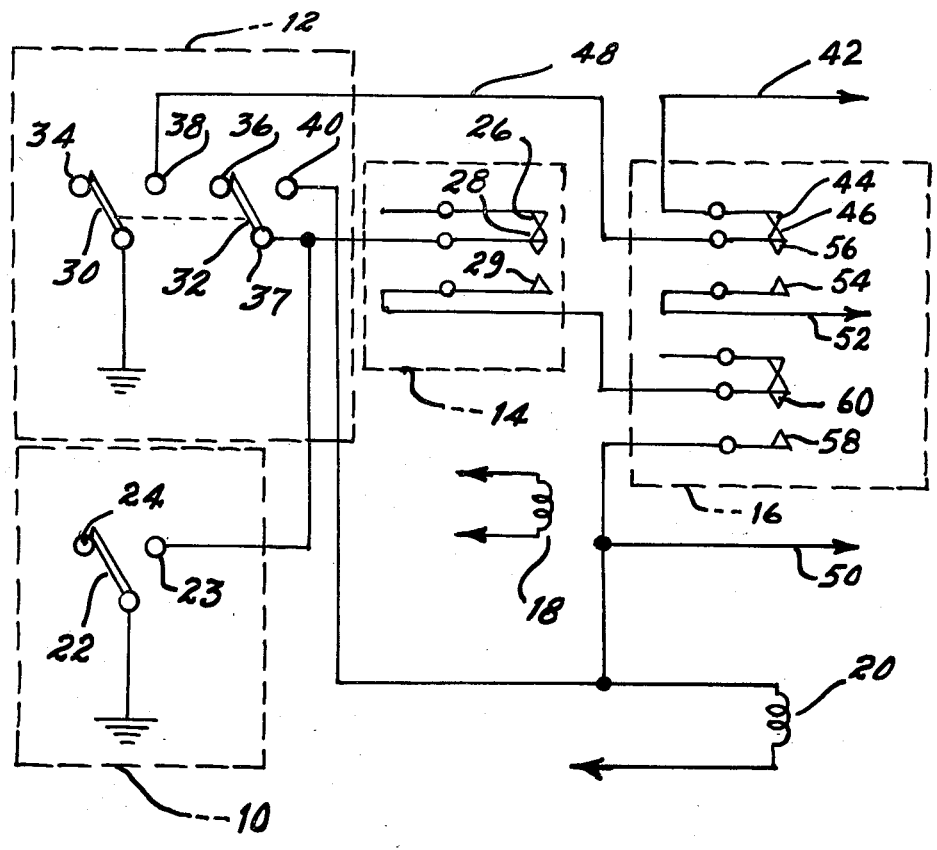

CLUTCH PROTECTION CIRCUIT

STATEMENT OF GOVERNMENT INTEREST

The invention described herein may be manufactured and used by or for the Government for governmental purposes without the payment of any royalty thereon.

This is a continuation-in-part of co-pending patent application Ser. No. 806,434 entitled CLUTCH PROTECTION CIRCUIT, filed by Jonathan M. Goode, June 14, 1977, and now abandoned.

BACKGROUND OF THE INVENTION

This invention relates generally to a protection circuit for electro-mechanical devices, and more particularly, to such a circuit for protecting tape punching computer systems.

Many of the computer systems utilized today include some form of paper tape having holes appropriately punched, thus storing information. This is particularly true where the system includes remote data links connected to a central data base. Generally, these remote links have a device resembling a common typewriter with an adapter for accepting a telephone hand set and a tape punching system. The tape punching system provides a small convenient, reproducible record of the data input to the computer.

One difficulty exists with tape punch systems, and that arises where power to the system, either completely fails, or is interrupted for some reason. When this situation occurs, the system must be completely recycled. Unlatched clutches will suffer excessive wear and quickly fail if recycling does not take place. Simple recycling has its own inherent difficulties in that the process causes extraneous holes to be punched in the tape and thereby raising the possibility of feeding improper data to the central computer.

This situation could be easily remedied by simply having the operator remove the tape and feed a separate, discardable tape through the tape punching system. However, in the case where the power failure is transistory or, is in fact a lowering of voltage momentarily, the operator may not be aware of the failure and hence, the extra holes punched with the resultant effects on the computer.

Various approaches have been tried to remedy the situation and none have thus far been successful. For example, integrated circuits have been considered to protect the tape punch system. However, the drive motor of the system has generated excessive noise for a fast, sensitive circuit. When an integrated circuit is designed to operate with the motor noise, it is too slow and lacks the sensitivity required to protect the system.

The invention described hereinafter avoids the difficulties of the prior art and provides a system of automatic protection for tape punch systems.

SUMMARY OF THE INVENTION

The invention provides protection for tape punch systems by utilizing a relay logic circuit and clutch protection cycle. The apparatus utilized in the invention is relatively simple and inexpensive to obtain and accordingly, these are objects of this invention.

By using a toggle type switch in concert with a push-button switch and two relays, connected in a new and unique manner, protection is provided for tape punch systems which include tape feed subsystems. A motor driving means is used to power ten clutches; one that engages a mechanism that propels the paper tape through the punch device, another that engages a punch that creates sprocket holes in the paper tape whenever it is being propelled, and eight data clutches that engage punches that create holes in the tape that represent information. The toggle switch provides control of the main power source. The push button provides a means for activating the tape feed mechanism. The relays prevent the tape feeder mechanism from starting except in the prescribed manner, regardless of the reason for motor shutdown.

The protection cycle consists of operating the punch clutches through one or more complete punch cycles. This causes clutches that may have become partially engaged during motor power down or up to be left in a disengaged state. This also causes extraneous holes to be punched in the output paper tape which must then be separated from valid output by the operator.

It is therefore an object of the invention to provide a new and improved clutch protection circuit.

It is another object of the invention to provide a new and improved clutch protection circuit that is reliable and easily maintained.

It is a further object of the invention to provide a new and improved clutch protection circuit that is fail safe.

It is still another object of the invention to provide a new and improved clutch protection circuit for tape punching devices that eliminates extraneous holes caused by power transients.

It is still a further object of the invention to provide a new and improved circuit to provide protection for electrical and electro-mechanical devices against power failure and power transients.

It is another object of the invention to provide a protection circuit which is economical to produce and utilizes conventional, currently available components that lend themselves to standard mass production manufacturing techniques.

These and other advantages, features, and objects of the invention will become more apparent from the following description, taken in connection with the illustrative embodiment in the accompanying drawing.

DESCRIPTION OF THE DRAWING

FIG. 1 is a block diagram of a system including the invention.

FIG. 2 is a circuit diagram of the invention.

DETAILED DESCRIPTION OF THE PREFERRED EMBODIMENT

FIG. 1 shows the invention protection circuit at 1. AC line power enters at 2 supplying the DC power supply 3 which feeds coil 20. AC power is fed to coil 18 via line 4. Output from the protection circuit when used, for example, with the Tally P-1200 paper tape punch is shown where line 42 feeds the motor control 5, feed control 6 and protection cycle generator 7. Line 52 feeds motor control 5 and feed control 6. Line 50 feeds motor control 5 and protection cycle generator 7.

The output from boxes 5, 6 and 7 is sent directly to the appropriate clutches. Motor control 5 connects to the clutch motor driving means 8. Feed control 6 has output to tape feed clutch 9 and sprocket hole punch clutch 11, while protection cycle generator 7 has output to the sprocket hole punch clutch 11 and data hole punch clutches 13.

Referring now to FIG. 2, a toggle type power switch is shown in the box 10, and a push button type tape feed switch is shown in box 12. Electromagnetic relays are shown in boxes 14 and 16 with their magnet coils designated as 18 and 20 respectively.

The system operates fundamentally in one of two modes e.g. power "off" and power "on". A power line transient is an abnormal condition of operation. Operating in the power off mode, switch 10 is in the position shown in the figure with grounded blade 22 on contact 24. Where the protective circuit complements a larger system, relay coil 18 is connected to the power line and with line power in the line, holds contacts 28 and 29 closed.

With push button switch 12 in the off position, switch blades 30 and 32 rest on blank contacts 34 and 36 respectively. In the case of power switch 10 "off" and feed switch 12 "on", switch blades 30 and 32 rest on contacts 38 and 40 respectively. Contact 38 connects line 42 through relay 16 and contacts 44 and 46, and line 48 to ground. Line 42 is connected to the tape punch system and causes the motor to operate, causing clutches to recycle, and then cause the tape to feed. This is the conventional sequence in the Tally P1200 paper tape punch for example.

Where power switch 10 is "on" and switch blade 22 is at contact 23, if switch 12 is "off", there is no action. With switch 12 "on", relay 16 is closed to ground via switch 12, contact 40, blade 32 and contact 37 to switch 10, contact 23 and blade 22. When closed, relay 16 is latched via power switch contact 23 and blade 22 to ground, and relay 14 contacts 28 and 29, and relay 16 contacts 58 and 60. This also holds line 50 low, forcing the motor to turn "on" and the protection cycle to operate. If switch 12 remains closed, tape will begin to feed because line 52 is grounded via contracts 54, 56 of relay 16 to line 48, contact 38 of switch 12. Alternatively, if switch 12 is opened at the end of the protection cycle, the motor will remain operating. However, there will be no tape feed in that only line 50 is now grounded.

In the event of pressing and releasing switch 12 with power switch 10 "on", tape will feed without the protection cycle because of grounded line 52 via contacts 54, 56 of relay 16 and line 48 to switch 12. If power switch 10 is moved to "off" the motor will stop because the holding for relay 16 is opened and contacts 23, 37, 28, 29, 58, 60 and line 50 are no longer connected to ground. In the aforementioned situation, line 50 had provided the ground to maintain the motor in an operating mode, while relay 16 was closed. Now relay 16 is opened, whereby activation of power switch 10 is insufficient to initiate motor operation.

In the case of a power line transient, relay 14 having electromagnet 18 connected to the power line, will open. This breaks the relay (16) holding circuit the same as if power switch blade 22 moved to contact 24. Power switch will remain "on"; however, an operator must press switch 12 before relay 16 will close and the motor start.

This circuit extends to any situation where a special event must occur at the time power is applied. It is particularly effective in the case where the special event is such that automatic restart is undesirable.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A protection circuit for use in devices having cyclic mutliple clutch system including, an AC power supply, a motor control means and clutch drive motor, a feed control means and feed clutches, a protection cycle generator and data clutches, the improvment comprising:
   a source of direct current power;
   a first electromagnetic relay switch having an electromagnet and a plurality of switch contacts;
   wherein one of the contacts is connected to the motor control means, the feed control means and the protection cycle generator and;
   wherein another of the contacts is connected to the motor control motors and feed control means;
   a second electromagnetic relay switch having an electromagnet and a plurality of switch contacts;
   wherein one of the contacts is connected to a contact of the first said relay switch;
   a biased switch having a plurality of switch contacts, wherein one of the contacts is connected to a contact of the first said relay switch, and wherein another of the contacts is connected to a contact of the second said relay switch;
   and a mechanical switch means having a plurality of switch contacts;
   wherein one of said contacts is connected to a contact of said bias switch.

2. A protection circuit according to claim 1 wherein, one contact of the bias switch is connected to the electromagnet of the first relay switch;
   wherein said contact is further connected to the protection cycle generator and motor control means and;
   wherein said contact is further connected to a contact of the first relay switch.

3. A protection switch according to claim 2 wherein; one contact of the bias switch is connected to ground.

4. A protection circuit according to claim 2 wherein, the electromagnet of the first relay switch is further connected to the AC power supply.

5. A protection circuit according to claim 1 wherein, the electromagnet of the second relay switch is connected to the source of direct current.

6. A protection circuit according to claim 1 wherein, one contact of the mechanical switch is connected to ground.

* * * * *